W. KELSO.
COUPLING RELEASE RIGGING.
APPLICATION FILED FEB. 4, 1915.
1,148,023.
Patented July 27, 1915.
2 SHEETS—SHEET 1.
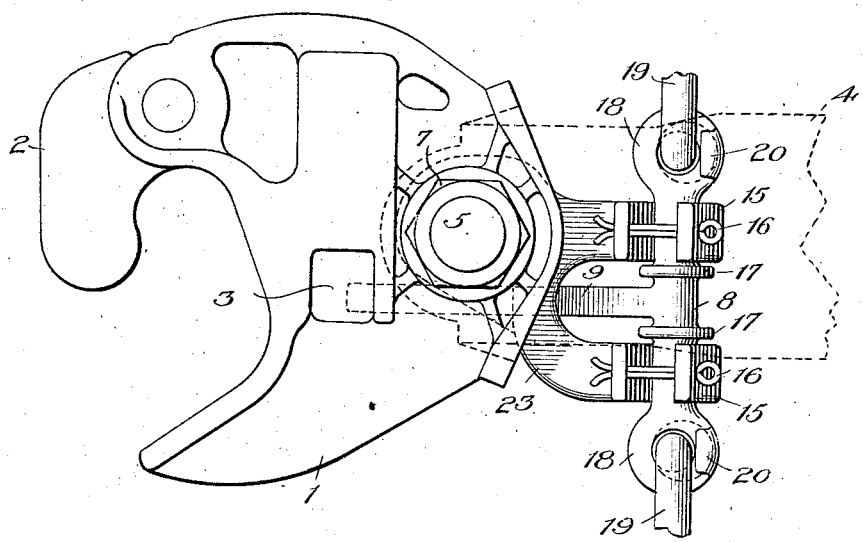
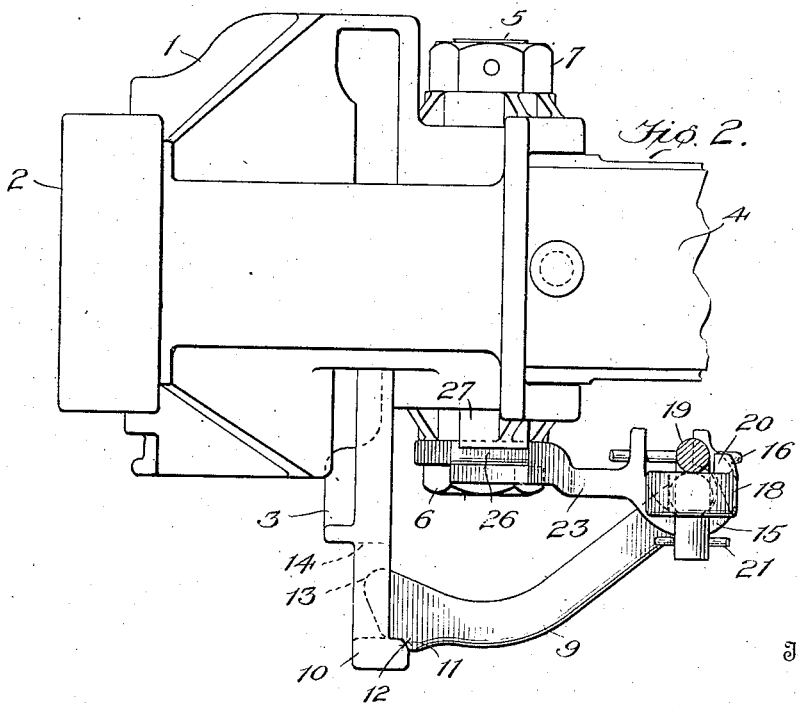
Witnesses
Edwin L. Bradford
Wm. C. Dye
Inventor
William Kelso
By Ritter & Ritter
His Attorney W. KELSO.
COUPLING RELEASE RIGGING.
APPLICATION FILED FEB. 4, 1915.
1,148,023.
Patented July 27, 1915.
2 SHEETS—SHEET 2.
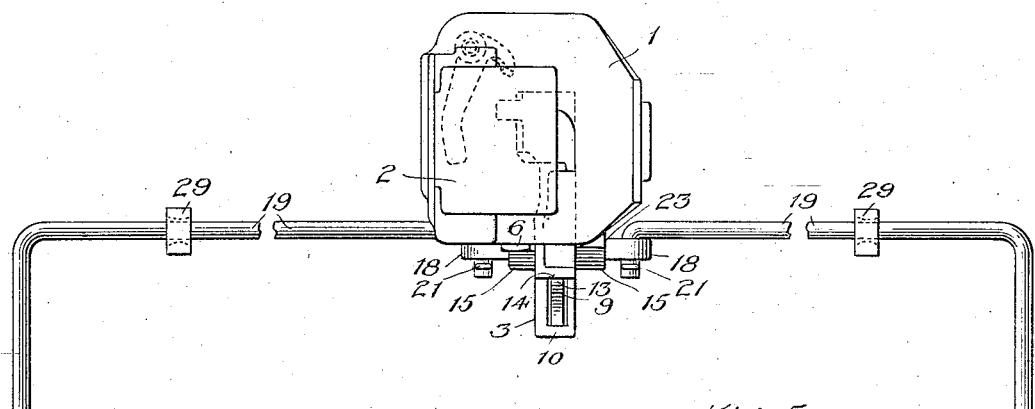
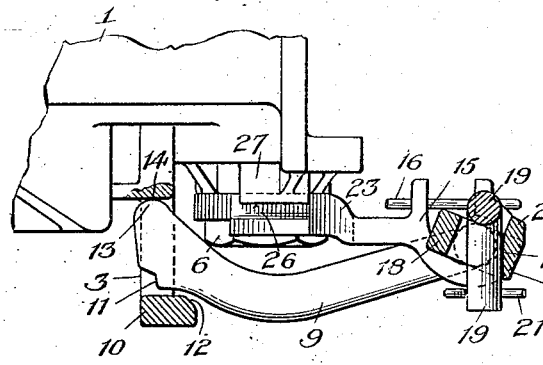
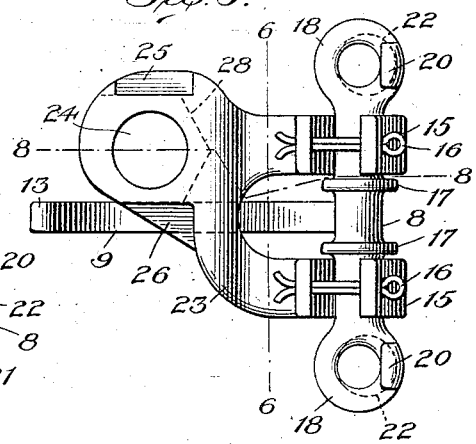
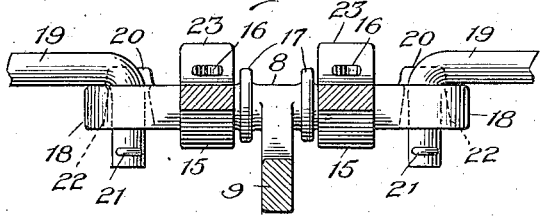
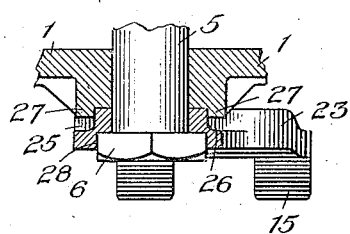
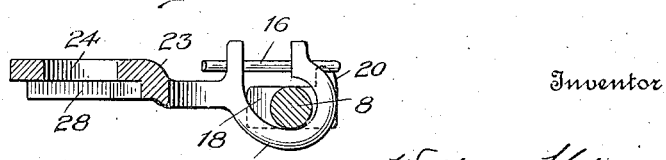
Witnesses
Edwin L. Bradford
Wm E Dyre
Inventor
William Kelso
By Ritter & Ritter
his Attorneys

UNITED STATES PATENT OFFICE.

WILLIAM KELSO, OF PITTSBURGH, PENNSYLVANIA, ASSIGNOR TO McCONWAY & TORLEY COMPANY, OF PITTSBURGH, PENNSYLVANIA, A CORPORATION OF PENNSYLVANIA.

COUPLING-RELEASE RIGGING.

1,148,023.  Specification of Letters Patent.  Patented July 27, 1915.

Application filed February 4, 1915. Serial No. 6,085.

*To all whom it may concern:*

Be it known that I, WILLIAM KELSO, a citizen of the United States, residing at Pittsburgh, in the county of Allegheny and State of Pennsylvania, have invented certain new and useful Improvements in Coupler-Release Rigging; and I do hereby declare the following to be a full, clear, and exact description of the invention, such as will enable others skilled in the art to which it appertains to make and use the same.

My invention relates to the construction of car couplers and especially to those in which the head is pivotally connected to its shank or stem so as to be capable of lateral swinging movements with respect to the latter; and the principal object of the invention is to provide such a coupler with an efficient release rigging which shall be simple in construction, compact in arrangement, strong and durable, easily operated, and of a form and nature rendering it generally applicable to swinging couplers without requiring special adaptations of parts in order to clear safety-chain anchorages, steam and air hose and other devices usually mounted on the ends of cars in any of the numerous locations where such devices are apt to be encountered on cars of different types and different designs.

A further object of my invention is to so form the several elements of the release rigging and to so combine them with each other and with the coupler head that one of said elements may engage and overlap a portion of the knuckle locking device above its lower end in a manner to always insure proper coöperation of the release rigging with the lock notwithstanding that wear upon the pivot pin and the enlargement of the corresponding pivot pin hole in the coupler stem due to the swinging movements of the head may have permitted the latter to shift its position longitudinally with respect to the stem, such a coördination of the mechanisms also enabling the lock engaging member of the release rigging to be conveniently and efficiently utilized as a means for preventing accidental unlocking of the coupler, as will hereinafter appear.

Another object of my invention is to produce a device of the character indicated which may be easily assembled or repaired and which may be applied to couplers now in extensive use without necessitating any changes in the construction of the coupler heads or stems thereof.

In the drawings illustrating the preferred embodiment of my invention, the scope whereof is pointed out in the claims. Figure 1 is a plan view of a coupler and a release rigging embodying my invention, portions of the uncoupling levers, which extend to the sides of the car in the well known manner, being omitted and the stem of the coupler being shown in dotted lines in order to more clearly disclose the underlying portions of the release rigging. Fig. 2 is a side elevation of the devices illustrated in Fig. 1. Fig. 3 is a front elevation of the coupler and release rigging. Fig. 4 is a detail view partly in side elevation and partly in section illustrating the operation of the release rigging in actuating the coupler lock. Fig. 5 is a detail plan view of a portion of the release rigging devices. Fig. 6 is a detail view taken on the line 6—6, Fig. 5. Fig. 7 is a detail view taken in a plane extending transversely of the coupler through the axis of the pivot pin on which the coupler head turns, said pivot pin being shown in elevation; and Fig. 8 is a detail vertical sectional view on the line 8—8, Fig. 5.

In the drawings, 1 indicates a coupler head having a knuckle 2 and a vertically movable lock 3 for retaining the knuckle in locked position. The coupler head is pivotally mounted on the coupler stem 4 by a vertically extending pivot pin 5, which is provided at its lower end with a polygonal head 6 and is threaded at its upper end to receive a nut 7 by which it is retained in assembled relation with said coupler head and stem.

Mounted beneath the coupler head so as to partake of the swinging movements thereof, and to the rear of the axis of rotation upon which the head 1 turns upon the stem 4, is a transversely extending revoluble shaft 8 which is provided with a forwardly extending arm 9 that is preferably integrally united to said shaft. The outer end of the arm 9 overlaps that portion of the lock 3 which projects downwardly beneath the coupler head. The lower end of said lock, as more particularly shown in Figs. 3 and 4, is preferably provided with a slot or opening into which the arm 9 extends, the lower end of said slot being closed to form a rest 10 for supporting the outer end of said arm when the parts of the coupler and the release rigging are in normal or locked positions. By this means the proper coöperative relation of the lock actuating arm 9 and the lock 3 is maintained with certainty at all times and in any position which the coupler head 1 may assume, notwithstanding that wear of the shaft 8 and of the bearings in which said shaft turns may produce a considerable looseness of parts; and this, therefore, enables the arm 9 to be effectively availed of as a means for preventing the lock 3 from accidentally moving to unlocked position while the coupler is in service. As a simple means for effecting this purpose it is preferred to form the arm 9 with a face or shoulder 11 which is adapted to engage a corresponding face or shoulder 12 on the lower end of the lock 3, the faces 11 and 12 being so related that it is necessary to lift the arm 9 sufficiently to disengage them and permit them to slide past each other horizontally before the lock 3 can be brought to unlocked position. As such a disengagement of the faces 11 and 12 can be brought about only through the upward rotation of the lock actuating member 9 of the release rigging it will be seen that the lock 3 is prevented from accidentally assuming an unlocked position. During the initial part of its swinging movement the arm 9 travels upwardly in the slot of the lock 3 without lifting the latter, but after such movement has proceeded to an extent sufficient to permit the faces 11 and 12 to slide past each other laterally and thereby permit the lock to rise, the upper and preferably rounded part 13 of the outer end of the said arm 9 engages the face 14 of the lock at the upper end of the slot therein, whereupon the continued upward rotation of said arm causes the lock to move to unlocked position or to execute such an extended movement as may be necessary to throw open the knuckle 2 when lock-actuated knuckle opening devices are employed.

The shaft 8 is rotatably mounted on the coupler head 1 to the rear of the pivot pin 5 in bearings 15 which are preferably large enough to permit said shaft to fit rather loosely therein, thereby preventing any possible binding of the shaft 8 in its bearings when the coupler is in service. The bearings 15 are preferably open at their tops so as to permit the ready introduction of the shaft 8, the latter being, as shown, conveniently retained in said bearings by means of cotter pins 16 which bridge the openings at the upper sides thereof. To prevent the shaft 8 from sliding in the bearings 15 in the direction of its length it may be provided with annular collars or shoulders 17 which are located between the said bearings and in close proximity to corresponding ones thereof.

The ends of the shaft 8 beyond the bearing members 15 are preferably formed with eyes 18 which receive the inner ends of corresponding crank shafts or uncoupling levers 19 that extend transversely in opposite directions to the sides of the car in the well known manner. The uncoupling levers 19 are supported from the car body near their outer ends so as to be capable of sliding, turning on their respective axes and oscillating in a horizontal plane, in order to accommodate themselves to the various movements of the coupler, as will be readily understood. As indicated in Fig. 3, supporting members 29, through which the members 19 pass, may be employed for this purpose. Cotters 21 which pass through the bent inner ends of the uncoupling levers 19 may conveniently serve to maintain the integrity of the connection of said uncoupling levers with the eyes 18 at the ends of the rotatable shaft 8.

As shown more particularly in Fig. 4 the openings of the eyes 18 are preferably flared or enlarged downwardly and toward the rear, as at 22, so as to permit the shaft 8 to rotate sufficiently to cause the lock-actuating arm 9 carried thereby to completely execute its upward movement while permitting the uncoupled levers 19 to remain in their normal positions. By this arrangement the uncoupling levers 19 are permitted to operate independently of each other, so that when the operator rotates one of them to actuate the shaft 8 and effect an unlocking of the coupler, the other uncoupling lever remains in its normal position and the operator is, therefore, relieved of the necessity of expending any force upon it. This form of connection of the uncoupling levers 19 to the shaft 8 also results in substantially eliminating lost motion of the uncoupling levers 19 when either is operated to effect an unlocking of the coupler. In order to afford an extended bearing for the uncoupling levers 19 when they are rotated to actuate the shaft 8, the eyes 18 at the ends of the shaft may be thickened or provided on their upper surfaces with lugs 20.

While the bearings for the shaft 8 might be integrally united to the coupler head 1 it is preferred, for the sake of economy as well as for facility in making repairs, to form them as a part of a bracket 23 which is secured to said head so that it may be removed therefrom, the pivot pin 5 by which the head 1 and stem 4 are connected being availed of to perform the office of a bolt for securing the said bracket 23 to the coupler head. To this end the bracket is preferably provided toward its forward end with an opening 24 which is adapted to receive the pivot pin 5, and adjacent to said opening said bracket is also provided with recesses 25 and 26, respectively, which are preferably oppositely disposed. These recesses receive lugs 27 with which the coupler head 1 is provided adjacent to the pivot pin opening in said head, the bracket 23 being thus caused to turn with the head, as will be readily understood. On its under side the bracket is provided with a recess 28 which receives the head 6 of the pivot pin 5, the vertical walls of said recess being adapted to engage corresponding vertical faces of the head 6 so as to prevent rotation of the pivot pin 5 with respect to said bracket and, consequently, with respect to the coupler head 1 also.

I claim:

1. In a device of the character indicated, the combination with a coupler head and its knuckle locking means, a coupler stem and means for pivotally connecting said head and stem, of mechanism for moving said knuckle locking means to unlocked position, said mechanism being supported beneath said head and being connected thereto so as to be movable therewith and being rotatable with respect to said head upon an axis lying to the rear of the axis on which the head turns with respect to said stem.

2. In a device of the character indicated, the combination with a coupler head and its knuckle locking means, a coupler stem and means for pivotally connecting said head and stem, of mechanism for moving said knuckle locking means to unlocked position, said locking means being movable vertically, and said mechanism being supported beneath said head and being rigidly connected thereto so as to be movable therewith and having a rotatable member which has its axis of rotation to the rear of the axis on which the head turns with respect to said stem and which is adapted to engage said locking means to move the same to unlocked position and which also is adapted to engage said locking means at a point above its lower end when the latter is in locked position.

3. In a device of the character indicated, the combination with a coupler head and its knuckle locking means, a coupler stem and a pin for pivotally connecting said head and stem, of mechanism for moving said knuckle locking means to unlocked position, said mechanism being supported beneath said head and being movable thereby and involving a bracket which is secured to said head through the instrumentality of said pivot pin, a shaft journaled in said bracket and provided with a forwardly extending arm which engages said locking means for actuating the same, and independently rotatable uncoupling levers movably connected to said shaft and extending on opposite sides of the coupler stem.

4. In a device of the character indicated, the combination with a coupler head and its knuckle locking means, a coupler stem and means for pivotally connecting said head and stem, of mechanism for moving said knuckle locking means to unlocked position, said mechanism being supported beneath and by said head to the rear of said pivotal connecting means and being movable with said head and being also supportingly engaged by said knuckle locking means when the latter is in locked position.

5. In a device of the character indicated, the combination with a coupler head and its knuckle locking means, a coupler stem and a pin for pivotally connecting said head and stem, a bracket secured to the coupler head by said pin and extending rearwardly from said pin, a shaft journaled in said bracket to the rear of said pin and provided with a forwardly extending arm whose forward end engages said knuckle locking means in advance of said pivot pin, and means for actuating said shaft to thereby cause the said arm to move the knuckle locking means to unlocked position.

6. In a device of the character indicated, the combination with a coupler head and its knuckle locking means, of a coupler stem and a headed pin for pivotally connecting said coupler head and stem, a bracket, and mechanism journaled on said bracket for moving said knuckle locking means to unlocked position, said bracket being attached to said coupler head by said pivot pin, and being interposed between the head of said pin and the coupler head, and being provided with means for engaging the head of said pin to prevent the rotation of said pin, and being also provided with means whereby it is caused to rotate with said coupler head about the axis of said pivot pin.

In testimony whereof I affix my signature, in the presence of two subscribing witnesses.

WILLIAM KELSO.

Witnesses:
 Wm. McConway, Jr.,
 E. M. Grove.